(12) United States Patent
Condry et al.

(10) Patent No.: US 9,323,935 B2
(45) Date of Patent: Apr. 26, 2016

(54) USER DEVICE SECURITY PROFILE

(71) Applicant: McAfee, Inc., Santa Clara, CA (US)

(72) Inventors: Michael Condry, San Jose, CA (US); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 73 days.

(21) Appl. No.: 13/718,200

(22) Filed: Dec. 18, 2012

(65) Prior Publication Data

US 2014/0173738 A1    Jun. 19, 2014

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *G06F 21/56* | (2013.01) |

(52) U.S. Cl.
CPC ............ *G06F 21/577* (2013.01); *G06F 21/568* (2013.01)

(58) Field of Classification Search
CPC ...... G06F 21/552; G06F 21/57; G06F 21/577
USPC ......................................................... 726/25
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,185,366 B2 * | 2/2007 | Mukai ................... | H04L 63/20 713/153 |
| 7,506,155 B1 | 3/2009 | Stewart et al. | |
| 7,844,530 B2 | 11/2010 | Ziade et al. | |
| 8,478,708 B1 * | 7/2013 | Larcom .................. | G06Q 10/10 706/52 |
| 8,621,637 B2 * | 12/2013 | Al-Harbi .............. | H04L 63/1433 713/188 |
| 8,726,379 B1 * | 5/2014 | Stiansen ............... | H04L 63/1441 726/22 |
| 2006/0282660 A1 | 12/2006 | Varghese et al. | |
| 2006/0282897 A1 * | 12/2006 | Sima .................... | G06F 11/3664 726/25 |
| 2007/0150932 A1 | 6/2007 | Milligan et al. | |
| 2009/0024663 A1 | 1/2009 | McGovern | |
| 2010/0095381 A1 | 4/2010 | Levi | |
| 2010/0125911 A1 * | 5/2010 | Bhaskaran ............. | G06Q 10/10 726/23 |
| 2011/0067086 A1 | 3/2011 | Nachenberg et al. | |
| 2011/0154498 A1 | 6/2011 | Fissel et al. | |

(Continued)

FOREIGN PATENT DOCUMENTS

| | | |
|---|---|---|
| WO | WO 2014/099194 A1 | 6/2014 |
| WO | WO 2014/099195 A1 | 6/2014 |

OTHER PUBLICATIONS

International Search Report and Written Opinion in International Application No. PCT/US2013/070457, mailed Mar. 4, 2014, 11 pages.
U.S. Appl. No. 13,718,043, filed Dec. 18, 2012, entitled "Security Broker," Inventor(s) Michael Condry, et al.

(Continued)

*Primary Examiner* — Dant Shaifer Harriman
(74) *Attorney, Agent, or Firm* — Patent Capital Group

(57) ABSTRACT

Attribute data of an endpoint computing device is collected that describes attributes of the endpoint computing device. The attribute data is communicated to a security score generator and security score data is received for the endpoint computing device. A graphical dashboard interface is caused to be presented on a display device, the dashboard interface presenting a plurality of security ratings based on the security score data, each security rating representing an amount of risk determined to be associated with a corresponding user activity on the endpoint device in a plurality of user activities.

23 Claims, 9 Drawing Sheets

(56) References Cited

U.S. PATENT DOCUMENTS

| | | | |
|---|---|---|---|
| 2011/0167011 A1* | 7/2011 | Paltenghe | G06Q 10/06 705/320 |
| 2011/0213628 A1* | 9/2011 | Peak | G06Q 40/08 705/4 |
| 2012/0167162 A1* | 6/2012 | Raleigh | G06F 21/57 726/1 |
| 2012/0174230 A1 | 7/2012 | Hoyt | |
| 2012/0185945 A1 | 7/2012 | Andres et al. | |
| 2012/0239928 A1 | 9/2012 | Judell | |
| 2012/0265690 A1 | 10/2012 | Bishop et al. | |
| 2013/0276124 A1* | 10/2013 | Tahir | G06F 21/577 726/25 |
| 2014/0172706 A1 | 6/2014 | Condry et al. | |

OTHER PUBLICATIONS

International Search Report and Written Opinion in International Application No. PCT/US2013/070458, mailed Mar. 13, 2014, 9 pages.
USPTO Mar. 20, 2015 Nonfinal Rejection in U.S. Appl. No. 13/718,043, 21 pages.
International Preliminary Report on Patentability in International Application No. PCT/US2013/070457, mailed Jul. 2, 2015, 10 pages.
International Preliminary Report on Patentability in International Application No. PCT/US2013/070458, mailed Jul. 2, 2015, 8 pages.
USPTO Sep. 24, 2015 Final Rejection in U.S. Appl. No. 13/718,043, 20 pages.

* cited by examiner

FIG. 3A

| Security Status | | | |
|---|---|---|---|
| Safe Web Browsing | Good | INFO | FIX |
| Secure Email | Good | INFO | FIX |
| Online Gaming | Good | INFO | FIX |
| Social Media | Warn | INFO | FIX |
| eCommerce | Warn | INFO | FIX |
| Online Banking | Risky | INFO | FIX |
| Taxes/Private Documents | Risky | INFO | FIX |

FIG. 3B

| Security Status | | | |
|---|---|---|---|
| Safe Web Browsing | Good | INFO | FIX |
| Secure Email | Good | INFO | FIX |
| Online Gaming | Good | INFO | FIX |
| eCommerce | Good | INFO | FIX |
| Social Media | Warn | INFO | FIX |
| Online Banking | Warn | INFO | FIX |
| Taxes/Private Documents | Risky | INFO | FIX |

330

| ANTI-SPYWARE | |
|---|---|
| Product | Ad-Aware SE Personal |
| On Access Scan | UNKNOWN |
| Data Current | FALSE |
| OPERATING SYSTEM | |
| Auto Update | Enabled |
| Updates Current | NOT APPLIED |
| System Restore | Enabled |
| Hidden File Extensions | Disabled |
| WEB BROWSER | |
| Initialize and script ActiveX controls not marked as safe | Disallow |
| Download signed ActiveX controls | Prompt |
| Download unsigned ActiveX controls | Disallow |
| Display mixed content | Prompt |
| Install desktop items | Prompt |

342 → (Data Current row)
335 (Anti-spyware section)
340 (Operating system section)

FIG. 3C

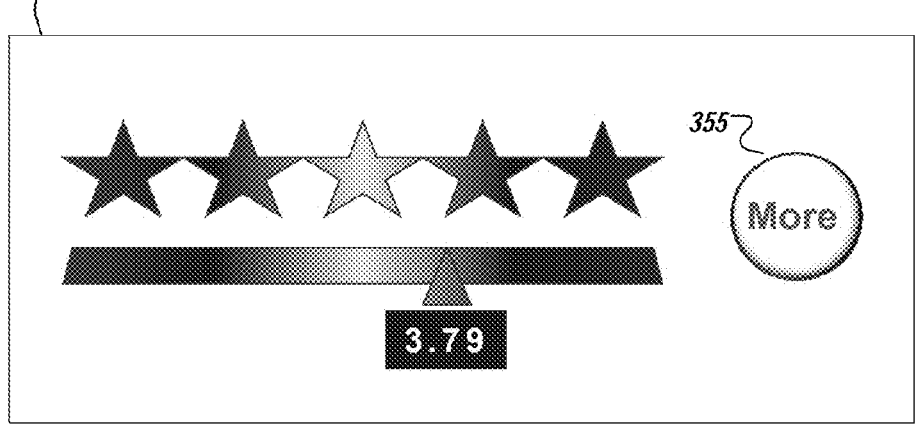

FIG. 3D

| Technology | Service | Vendor | Product | Version | Available | Active | Score |
|---|---|---|---|---|---|---|---|
| Malware | Anti-Virus | Vendor A | Product A | 8.2.0 | Yes | Yes | 90 |
| Data/Asset | Storage Encryption | Vendor B | Product B | 1.1.1 | Yes | Yes | 20 |
| | Patch | Vendor C | Product C | 3.0 | Yes | Yes | 85 |
| | Anti-Theft | Vendor D | Product D | 0.4.3 | Yes | Yes | 5 |
| | Firewall | Vendor C | Product E | 2008 | Yes | Yes | 60 |
| Identity/ Network | Identity | Vendor E | Product F | 1.0 | Yes | No | 0 |
| Recovery | System Recovery | Vendor E | Product G | 4.6 | Yes | No | 0 |
| | | | | | | Security Rating | 2.98 |

USER DEVICE SECURITY PROFILE

TECHNICAL FIELD

This disclosure relates in general to the field of computer security and, more particularly, to end-user computing risk assessment.

BACKGROUND

The Internet has enabled interconnection of different computer networks and devices all over the world. The ability to effectively protect and maintain stable computers and systems, however, presents a significant obstacle for component manufacturers, system designers, computer and network operators. This obstacle is made even more complicated due to the continually-evolving array of tactics exploited by malicious software authors as well as the never-ceasing development of new computing devices and software vulnerable to such threats and others. Risk can be assessed for computing devices and environments and may be based on the vulnerabilities present on the respective computing device as well as threats to which a computing device is exposed. For instance, risk can be assessed within an enterprise computing environment based on risk present in the respective computing devices and networks within the enterprise computing environment. In such instances, administrators can utilize risk scores computed for their systems and environments to appreciate what types of security weaknesses and risk face the systems, together with the amount of risk, and the devices most affected by risk within the system. Consumer security tools also exist for use on private and home computers and networks that can provide risk assessments of such private computing devices and networks. Home users, however, are often less sophisticated in their understanding of risks facing their systems and slower in their adoption of available security tools.

BRIEF DESCRIPTION OF THE DRAWINGS

FIGS. 3A-3D are example screenshots for presentation in connection with an example security dashboard in accordance with at least one embodiment;

FIG. 5 is a chart illustrating a simplified representation of host device attribute information used in generation of a use-based risk score in accordance with at least one embodiment;

Like reference numbers and designations in the various drawings indicate like elements.

DETAILED DESCRIPTION OF EXAMPLE EMBODIMENTS

Figure 1:
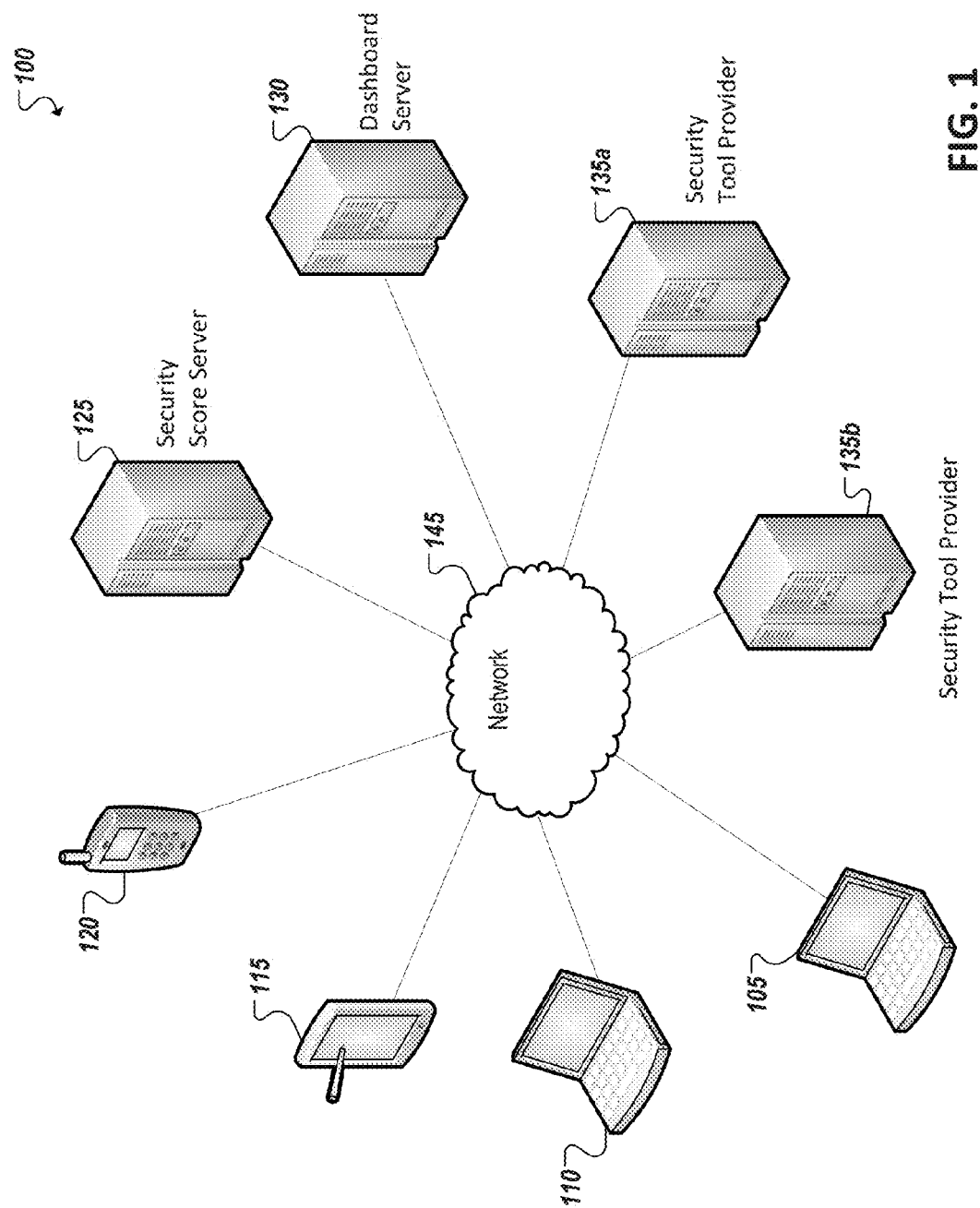
FIG. 1 is a simplified schematic diagram of an example computing system including functionality for providing a security score for an end-point device in accordance with at least one embodiment.

FIG. 1 is a simplified block diagram illustrating an example computing system 100 including end-user host devices 105, 110, 115, 120 for which corresponding security scores can be generated. The security scores can be based on security postures determined for the host devices 105, 110, 115, 120. Further, a security score for a host device (e.g., 105, 110, 115, 120) can include a set of scores each representing risk associated with a respective one of a plurality of common uses of the host device. Generating scores that rate the security of various uses of a host device can provide, among other advantages, a more user-friendly representation of risk on a host device within a context the user is familiar with, rather than more technical and configuration-focused representations of security and risk on a consumer host device, among other features and examples disclosed herein.

In some implementations, system 100 can further include tools for use in connection with the risk assessment and risk scoring of end-user host devices 105, 110, 115, 120. For instance, in one example, a security score server 125, dashboard server 130, and security tool providers 135*a*, 135*b*, among other devices, subsystems, and entities can be provided. Additionally, host devices 105, 110, 115, 120 can communicate with and consume services and resources provided through one or more (or combinations) of security score server 125, dashboard server 130, and security tool providers 135*a*, 135*b*, among other subsystems and components, using one or more networks 145, including private networks, public networks, wireline, and wireless networks and combinations of computing networks, including the Internet.

In one example implementation, security data can be collected from the end-user host devices 105, 110, 115, 120, the security data describing attributes of the respective host devices (e.g., 105, 110, 115, 120) relevant to host device's security of the host devices. Such security data can be accessed directly from the host device and describe such attributes as the host device's operating system, hardware, installed software, deployed countermeasures, detected vulnerabilities, etc. Additionally, in some implementations, security data can be obtained from security tools (e.g., 135*a*, 135*b*) remote from the host devices but collecting information from and/or concerning attributes of the host devices. Security data from remote security tools can supplement security data obtained internally from the host device. Security data, originating either local to or remote from a host device, can then be used by a security score engine to generate a security posture for the host device identifying those attributes of the device negatively and/or positively affecting the device's security. In some instances, at least a portion of the security score engine can be provided locally on the host device (e.g., in connection with a security score dashboard engine) and/or remote from the host device, such as in instances where at least a portion of the security score engine is served by a security score server (e.g., 125).

A security posture generated by a security score engine for a particular host device can be utilized by a security dashboard engine to generate a presentation for display on the host device (or another device). The security dashboard, in some implementations, can present risk scores associated with each of a plurality of different uses of the host device, thereby providing the user with use-based risk scores and a risk assessment to which the user can relate, such as one tied to the way the user sees and uses their computing device. Instances of a security dashboard engine can be provided to a plurality of different host devices and host device types (e.g., 105, 110, 115, 120) through a security dashboard server (e.g., 130). In some implementations, a security dashboard engine can be downloaded from and distributed by a security dashboard server 130, allowing for wide penetration of the security dashboard engine across a computing environment 100. Mass deployment of a dashboard engine can allow, in some implementations, for relative security scores to be generated, such as score comparing a single host device's risk to an average, median, or other relative risk measure across a plurality of host devices, among other examples.

In general, "servers," "clients," "computing devices," "host devices," "endpoint devices," "network elements," "hosts," and "systems," including host and server devices in example computing environment 100 (e.g., 105, 120, 125, 130, 135a, 135b, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 135a 135b, etc.) can each include one or more processors, computer-readable memory, and one or more interfaces, among other features and hardware. Servers can include any suitable software component or module, or computing device(s) capable of hosting and/or serving software applications and services (e.g., security score server 125, dashboard server 130, and security tool providers 135a, 135b, etc.), including distributed, enterprise, or cloud-based software applications, data, and services. For instance, in some implementations, a security score server 125 or other sub-system of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

Host, endpoint, client, or client computing devices (e.g., 105, 110, 115, 120, etc.) can include traditional and mobile computing devices, including personal computers, laptop computers, tablet computers, smartphones, personal digital assistants, feature phones, handheld video game consoles, notebook computers, desktop computers, internet-enabled televisions, and other devices designed to interface with human users and capable of communicating with other devices over one or more networks (e.g., 145). Such devices can also include computer-assisted, or "smart," appliances, such as household and industrial devices and machines that include computer processors and/or one or more software programs executed by the computer processors that control, monitor, assist, supplement, or otherwise enhance the functionality of the devices. Computer-assisted appliances can include a wide-variety of computer-assisted machines and products including refrigerators, washing machines, automobiles, HVAC systems, industrial machinery, ovens, security systems, and so on.

Attributes of host computing devices, computer-assisted appliances, servers, and computing devices generally can vary widely from device to device, including the respective operating systems and collections of applications, security tools, and other software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices. A similarly diverse array of hardware can be utilized and included in host computing devices, including a variety of different chip sets, ports, display devices, network interface hardware, input devices, peripherals, and other hardware-based components. Graphical display devices and user interfaces, supported by computer processors of the host devices, can further allow a user to view and interact with graphical user interfaces of applications and other programs provided in system 100, including user interfaces and graphical representations of programs interacting with applications hosted within the host devices, as well as graphical user interfaces associated with remote servers, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditional risk assessment tools assess the quantitative or qualitative value of risk related to a concrete situation and a recognized threat and have focused on the particular threats or vulnerabilities, as well as the technical configurations and attributes of a system that relate to these threats and vulnerabilities. Average users, however, are typically not experts in computing systems or computer security or the technical features that contribute to assessments of computer security. This notwithstanding, average users nonetheless tend to care deeply about the security of their machines. By generating risk score relating to users' uses of computing devices, users can appreciate in terms of their daily use of their computers, how various vulnerabilities and threats are affecting their machines. Further, appreciating these risks can assist users in avoiding such activities altogether or taking preventative measures to reduce the risk associated with a particular computing activity or use.

A threat can broadly refer to something that causes, attempts to cause, or potentially could cause a negative impact to an objective or an asset. For example, a threat may include malware that could disrupt business operations, a natural disaster, an organization that is targeting a person, industry, etc., or even a partner or vendor that has been compromised. A vulnerability can generally include any weakness or condition that can be affected by or exploited by a threat. A vulnerability may include, for example, misconfigured software or hardware; an employee susceptible to manipulation, temptation, or persuasion; inadequate security measures, password protections, etc., or a facility housing the system and assets not being equipped with adequate security measures such as a fire extinguishers, locks, monitoring equipment, etc. or other adequate security measures. A countermeasure can include anything that can mitigate a vulnerability or threat, such as antivirus software, intrusion protection systems, a software patch, a background check, hardware upgrades, network security tools, password strength, encryption schemes, among many other examples both deployed locally at the device or on other, remote devices, such as network elements, used or in communication with the device. For instance, examples of countermeasures and security tools can include such tools and services as antivirus, antimalware, host intrusion protection systems (HIPS), whitelists, blacklists, hardware-enabled security, trusted boot states, among many other potential examples. The presence or availability of such tools can be reflected in security posture data for a particular host device.

Quantitative risk assessment, in some instances, can include the evaluation of both the magnitude of the potential impact (e.g., loss or harm) to an asset, and the probability that an event will cause the impact. The combination of these components can be used to create a risk metric that is both forward-looking and has predictive capabilities. The ability to predict allows for identification of risk metrics relating to various assets within an operating environment or the operating environment as a whole, as well as allowing for prioritization of tasks to reduce risk, which is the foundation of in connection with risk management of the operating environment. Managing risk can include identifying, characterizing, and assessing threats; assessing vulnerability of assets to specific threats; determining the risk to specific assets based on specific vulnerabilities and threats; and implementing strategies for reducing or eliminating the risk, including the identification of countermeasures that wholly or partially eliminate a threat or vulnerability responsible for a particular risk.

Figure 2:
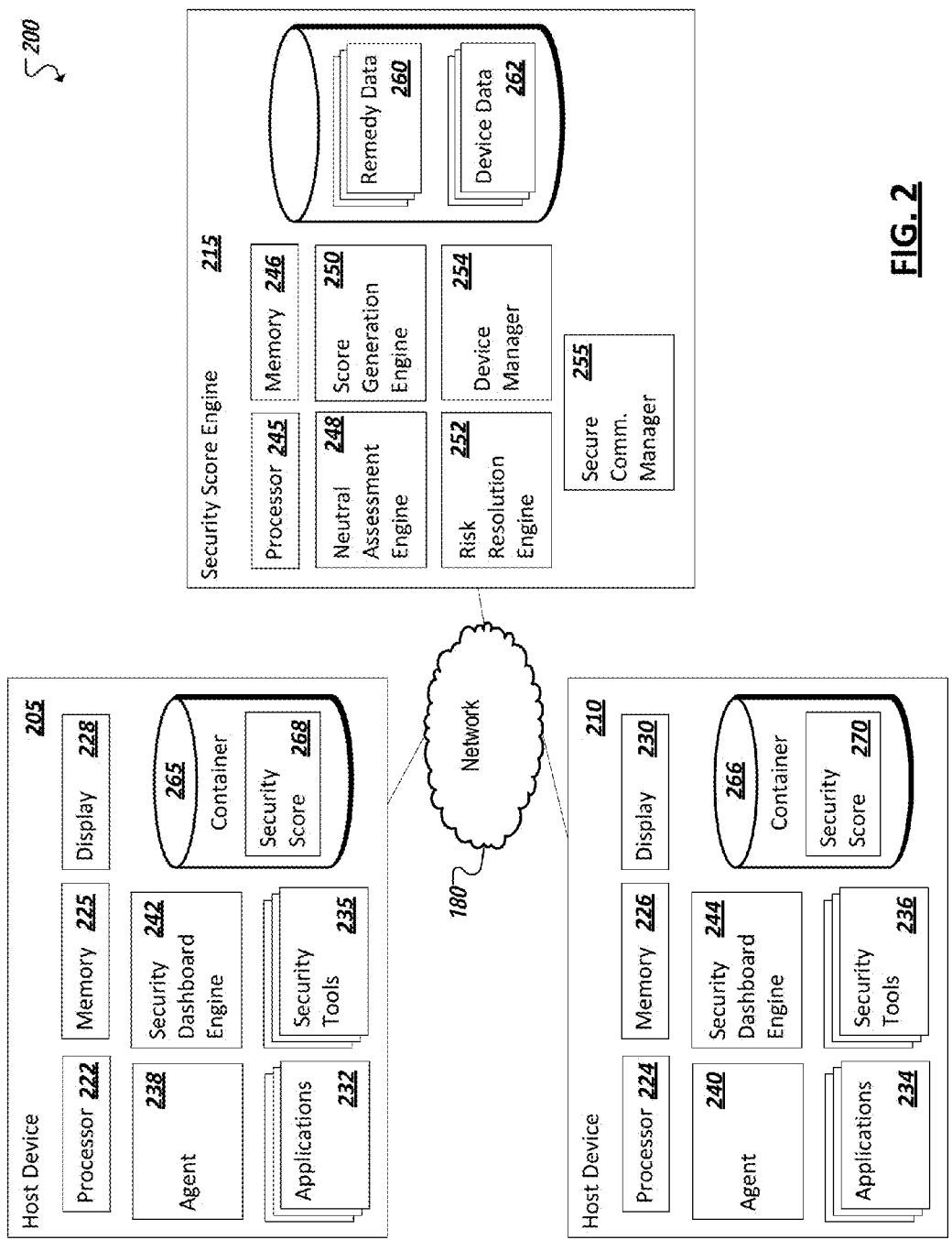
FIG. 2 is a simplified block diagram of an example computing system including an example security score generator in accordance with at least one embodiment.

At least some of the systems described in the present disclosure, such as the systems of FIGS. 1 and 2, can include functionality that, in some cases, can overcome at least some of the above-discussed deficiencies and possess at least some of the above-discussed advantages, as well as remedy other deficiencies and possess other advantages not explicitly described herein. For instance, in the example of FIG. 2, a simplified block diagram 200 is shown illustrating host devices 205, 210 utilizing a security score engine 215 in connection with the generation of use-based risk scores for each of a plurality of respective host devices (e.g., 205, 210).

In one implementation, host devices 205, 210 can include processors (e.g., 222, 224), memory elements (e.g., 225, 226), display devices (e.g., 228, 230), among other hardware and software components. For instance, in one example, host devices 205, 210 can include respective sets of applications (e.g., 232, 234), operating systems, and other software programs installed or otherwise used by the host device 205, 210. Additionally, each host device can include and utilize one or more security tools (e.g., 235, 236) implemented either in whole or in part on the host device (e.g., 205, 210) or on remote computing devices, such as on networks utilized by the host devices. Security tools 235, 236 can include such tools as antivirus tools, antimalware tools, antispyware tools, firewalls, intrusion detection systems, encryption capabilities, security suite programs, among many others, including products from a variety of different vendors and providers.

Host devices 205, 210 can additionally include components such as an agent 238, 240 and security dashboard engine 242, 244, in some implementations. An agent 238 can be an at least partially software-based tool possessing functionality to collect and catalogue information pertaining to the configurations, hardware, installed software, user behavior, peripherals, utilized security tools, operating system status, password strength, encryption tools, network use, geolocation, user identity, and other attributes of the host device monitored by the agent 238, 240. An agent 238, 240 can assemble profile data for the host device 205, 210 potentially including any identifiable host device attribute pertaining to one or more security categories. Host device profile data, such as that collected using agent 238, 240, can be communicated with a trusted security score engine 215 for use by the security score engine 215 in generating a security posture for the host device (e.g., 205, 210) based on the respective host device's attributes.

In some instances, a security score engine 215 can include one or more processors 245 and memory elements 246, as well as software-based and/or hardware-based components including, for instance, a neutral assessment engine 248, score generation engine 250, threat feed monitor 252, device, manager 254, and secure communications manager 255, among potentially others or combinations thereof. In some implementations, a neutral assessment engine 248 can be provided, in part, to provide users (e.g., of host devices 205, 210) with a measure of confidence that security assessments performed using security score engine 215 are neutral and not arbitrarily biased toward certain products, vendors, or other parties who may have an interest, financial or otherwise, in potentially influencing the security assessment (e.g., application providers interested in having their software graded as trustworthy, or security tool providers interested in having their tools graded as particularly effective and beneficial to a device's overall security).

In some instances, neutral assessment guidelines can be developed by a disinterested or neutral third-party (not illustrated in FIG. 2) for use by the security score engine. Neutral assessment guidelines can be developed based on the neutral party's assessment of a variety of software and hardware to neutrally grade the vulnerabilities and risks of such products, and further assesses security tools for their effectiveness in guarding the security of their respective customer host devices (e.g., 205, 210). Such neutral assessment guidelines can be accessed by neutral assessment engine 248, in some implementations, and updates to the assessment guidelines (e.g., in response to new threats, improvements in particular programs or tools, etc.) can be pulled by or pushed to the neutral assessment engine 248 to insure that the neutral assessment engine 248 continues to accurately and neutrally represent the strengths and weaknesses of particular configurations, vulnerabilities, products, etc. potentially on one or more host device machines (e.g., 205, 210). In other implementations, the neutral assessment engine 248 can itself conduct the neutral assessment of applications, hardware, security tools, etc. (e.g., in instances where the manager or provider of security score engine 215 is itself considered a neutral party).

In instances of neutral assessment guidelines, various general attributes of host devices can be assessed. For instance, various hardware, software programs, identified user behaviors, identified network connections known to be potentially relevant to one or more host devices, among other potential attributes of host devices can be assessed for particular vulnerabilities and associated risk. As one illustrative example, neutral assessment guidelines can assess each and every version of a particular application or operating system and identify that one or more versions of the particular application include a particular known vulnerability. Similar assessments can be provided for an exhaustive collection of potential host device software applications, security tools, networks, user behaviors, and other host device attributes. For instance, available security tools potentially utilized by one or more host devices, can also be assessed, for instance, to determine whether and to what degree each security tool is effective as a countermeasure to one or more known vulnerabilities or threats. Neutrally assessing these attributes can insure that particular vulnerabilities, performance, weaknesses, etc. of particular products or services are fairly and accurately accounted for and not inaccurately downplayed or exaggerated by a party (e.g., the product's developer) interested in the reputation of the assessed product(s).

An example score generation engine 250 can utilize neutral assessment guidelines (as well as other assessment guidelines) in connection with the generation of a security posture and/or other security-related score for a particular host device based on known attributes of the particular host device. Host device attributes described in profile information for the host device (such as profile information collected from an agent (e.g., 238, 240) on the host device or other services and monitors local to or remote from the host device), can be compared or otherwise assessed against assessment guidelines by score generation engine 250 to identify the presence of particular vulnerabilities, countermeasures, and strengths of a particular host device. In some instances, identified vulnerabilities, countermeasures, or strengths can be conditional, in that circumstances of the host device's use or operation affect the potency (or existence) of a particular vulnerability, countermeasure, or strength, such as when certain (e.g., safe or risky) users are using the device, when certain programs are active, when the device is utilizing a particular network connection, when certain device functionality is turned on, etc.). This information can then also be included in a security posture generated by the security score engine 215 for the particular host device.

In some implementations, a security posture by itself may only provide an accounting of the various vulnerabilities, countermeasures, and risks present on the host device, as well as the connections between individual host device attributes and the identified vulnerabilities, countermeasures, and risks identified for the host device, together with any caveats, conditions, and criticality of the identified vulnerabilities, countermeasures, etc. Such a security posture can then be used as the basis or an input of one or more security scores calculated for (and/or potentially by) the host device (e.g., 205, 210). In some instances, the score generation engine 250 itself can generate such scores and communicate them to the relevant host, while in other instances, a security score can be generated, at least in part, locally on the host device (e.g., using security dashboard engine 242, 244) from a security posture communicated from the security score engine 215 to the host device (e.g., 205, 210).

Generation of a security score for a host device (e.g., 205, 210) can include the generation of a use-based risk score. A use-based risk score, rather than scoring security of the host device from the context of particular attributes and configurations (e.g., network security score, firewall score, password strength score, hardware security score, etc.), scores the host device within the context of the riskiness of potential activities or uses of the host device. For instance, a use-based risk score can include sub-scores for each of a plurality of potential uses of the host device. For instance, a sub-score can indicate the riskiness of engaging in a particular activity using the host device, including surfing the Internet, streaming media, engaging in ecommerce transactions, sending emails, participating in online banking, social media, online gaming, and so on. While a use-based risk score is based on the underlying attributes of the host device, the score abstracts the specific underlying attributes, representing the risk present on a host device in terms that users understand (i.e., the potential uses of a host device), assisting those users potentially intimidated by and not familiar with or expert in the underlying technical specifications and configurations of their devices, to understand the health of their devices.

A use-based risk score can be generated based on a generated security posture of the host device. A use-based scoring engine, whether embodied in security dashboard engine 242, 244 and/or score generation engine 250, can map particular attributes and categories of attributes to particular uses for which the attributes are relevant to a score can be generated. For instance, a security posture of a host device 205 can indicate vulnerabilities relating to a web browser configuration, encryption capabilities of the host device, and web browsing behavior to a particular user of the host device 205, among other attributes. From these attributes, the subset of attributes relating to the host device's participation in social media applications can be identified and then used in the calculation of a social media use score for the host device 205, as an example. Further, in some implementations, in addition to mapping particular attributes to risk associated with particular uses (to which the attributes are relevant), a use-based scoring engine can also weight the respective relevance of each device attribute mapped to particular uses (i.e., indicating the relevance of a particular attribute to risk associated with the use). Weighting can allow for proper consideration of those attributes having a more profound influence on the riskiness of a particular host device use relative to other attributes mapped to the same use.

In some implementations, score data, including use-based score data, can be consumed or used by security dashboard engines 242, 244 installed on or otherwise used by respective host devices 205, 210. In some instances, score data may include security posture data indicating attributes of a host device relevant to host device security. In other instances, score data may include an aggregate security score or other non-use-based risk score, while in still other implementations, score data may include use-based risk scores, including security scores for each of a plurality of potential uses of the host device. Score data can be generated by a security score engine 215 and communicated to a host device over a network 180. Access to the score data at a host device can be limited to authorized client devices, and in some instances, limited to the host device for which the security score data applies. In other instances, score data for a first host device can be accessed by a second host device, for instance, based on authentication of a user to the other, first host device's score data, among other examples. In still other implementations, at least a portion of security dashboard engine can be hosted by a server device remote from a user host device, serving the security dashboard engine as a service to client devices, including host devices for which security score data and security dashboard presentation are generated.

Score data accessed by a host device can be consumed by a security dashboard engine 242, 244 to render a presentation of security scores on a display device of the host device. The presentation of security scores can include a security dashboard that includes, among other presented information, use-based risk scores for a particular host device. As noted above, some implementations of security dashboard engine 242, 244 can process and perform calculations on score data, according to a variety of scoring algorithms, to generate security scores and other data for presentation in a security dashboard rendered by the security dashboard engine 242, 244.

By way of example, FIGS. 3A-3D illustrate example screen shots of at least a portion of some example security dashboards generated by example implementations of a security dashboard engine (e.g., 242, 244). For instance, turning to FIG. 3A, a screenshot is presented of a portion 300a of a security dashboard presenting a plurality of a use-based risk scores generated for a particular host device. As shown in the FIG. 3A, individual use-based risk scores can be calculated for each potential use of the particular host device including, in this example, safe web browsing, secure email, online gaming, social media, ecommerce, online banking, financial/private documents, among potentially many others. Each row in the presented dashboard 300a can represent a potential use of the particular host device and include score indicators (e.g., 305, 320a, 325a) representing a relative level of safety or risk determined for the potential use. Based on the indication (e.g., at 305, 320a, 325a) of the particular host device's security with regard to a particular activity, a user can be made aware of the risk inherent in using the particular host device in connection with the indicated particular activity. For instance, in the example of FIG. 3A, a user can be presented with a "Good" score indicator 305 indicating a use-based risk score suggesting low risk associated with the particular host device when web browsing.

Use-based scores represented, for instance, in a security dashboard 300a, can be based on security posture data for the particular host device indicating, for example, installation and frequent use of a version of a browser considered (e.g., through a neutral assessment of a universe of host device attributes) to be a browser than enables safe web browsing. The presence, availability, and evidence of use of other software applications, operating systems, and security tools of the particular host device that further enable and suggest low risk associated with web browsing on the particular host device can also be considered in the generation of a use-based risk score for web browsing for the particular host device, leading to a positive security score indicated by graphical indicator 305. Use-based risk scores for other potential uses of the particular host device may indicate more risk, such as, in this example, social media, ecommerce, online banking, and financial and private information communications, as shown by the indicators "Warn" and "Risky" shown in FIG. 3A. Similarly, host device attribute information and identified related neutral assessments of the attributes can be considered in the generation of remaining use-based risk scores for the potential uses of the particular host device, the use-based risk score forming the basis for the presentation of corresponding score indicators (e.g., 305, 320a, 325a) in security dashboard 300a.

While the examples of FIGS. 3A and 3B show score indicators that quantize a specific use-based risk score into one of a fixed set of potential indicators (e.g., "Excellent," "Good," "Warn," "Risky" uses, etc.), in other implementations, other representations of use-based risk scores can be included in an example security dashboard. For instance, presentation of a precise score value (e.g., on a scale of 0-10 or 0-100) can be presented along with a color (e.g., green, yellow, red) indicating whether the precise numerical score represents a generally safe, mixed, or risky use of the host device. In any event, a variety of user-friendly conventions can be employed to quickly and simply represent use-based risk profiles of a host device to its user to thereby guide the user in their use of the host device as well as in their management of the host device's security.

In some implementations, a security dashboard can further include interactive controls that assist users in better understanding the basis and nature of the security status of their device, as well as the potential remedies and improvements that can be employed to improve the use-based risk profile of their device. In one example, an "INFO" button (e.g., 310) can be presented corresponding to a particular use-based risk score of the host device. For example, in this case, a user can select INFO button 310 corresponding to a Safe Web Browsing use category to prompt the presentation of additional information or windows including information describing the security profile of Safe Web Browsing in more detail. For instance, selection of an INFO button (e.g., 310) can present a description of the types of risks and threats that can potentially afflict a category of device usage generally, as well as breakdown the specific attributes of the particular host device leading to the generated use-based score. As an example, as shown in the screenshot of FIG. 3C, selection of the INFO button 310 for Safe Web Browsing can result in the presentation of a detailed view 330 showing the more technical description of configurations and attributes of the host device relevant to the security of using the host device for web browsing (and otherwise hidden or abstracted in the presented security dashboard). Visual effects and other indicators (e.g., 335, 340) can be presented within the listing 330 calling attention to those host device attributes that contribute negatively (or positively) to the use-base risk score for the particular use (e.g., web browsing, ecommerce, etc.). Presentation of a detailed view of the attributes and sub-systems of the host device can allow a more experienced or confident user to view a more traditional attribute-focused security assessment to better understand and consider the technical aspects underlying a use-based risk score. Additional information, such as information from outside sources, can be linked to through one or more of the user interfaces, such as links presented beside each element in the listing 330. For example, a user can gain additional knowledge concerning one or more of the host device attributes considered in the determination of a use-based risk score by clicking on a corresponding link (e.g., 342), among other mechanisms and examples. For instance, returning to the examples of FIGS. 3A-3B, in some implementations, detailed information presented in connection with the selection of the INFO button 310 can include information describing the types of risks inherent in a particular host device use, the types of threats, attacks, and damage that can result, as well as some of the general techniques and tools that can be applied to avoid or counter these risks. Such information can be provided to serve an educational purpose, assisting users in understanding what types of configurations, programs, networks, user behaviors, etc. make a particular type of computer use risky.

In addition to INFO buttons (e.g., 310) or other controls providing more detailed views of a use-based risk score, security dashboard 300a can further include additional controls, such as controls (e.g., 315, 318) adapted to launch potential remedies to identified deficiencies, vulnerabilities, and risks associated with a particular host device use. For instance, selection of a FIX button 315 for a Social Media use can cause a presentation of a listing of potential remedies for risk determined in connection with the Social Media use. For instance, selection of FIX button 315 can present a listing of potential countermeasures that can be activated, installed, downloaded, or otherwise used, at the request of the user, to mitigate against vulnerabilities and threats associated with Social Media use. In some instances, countermeasures can be selected and downloaded, activated, or otherwise deployed directly from the presented listing of potential remedies presented in response to selection of FIX button 315. In other instances, selection of FIX button 315 can itself automate selection and deployment of one or more countermeasures without further intervention by the user. In either instance, countermeasures can be automatically identified that have been previously determined to potentially address those vulnerabilities and other attributes of the host device (e.g., as identified in the related security posture data) relating to a particular host device use.

Additionally, deployment of countermeasures and other potential remedies, for instance based on selection of FIX button 315, can result in the dynamic improvement of the use-based risk facing a host device. Indeed, in response to deploying one or more countermeasures related to a particular use, the corresponding use-based risk score for the host device can also be improved and reflected in presentations of use-based risk scores in a security dashboard. For instance, selection of FIX buttons 315 and 320, corresponding to Social Media use and Online Banking uses, can result in the deployment of countermeasures addressing respective weaknesses of the host device relating to these two uses and thereby also result in the improvement of corresponding use-based risk scores as shown in the evolution of score indicators 320a, 320b, 325a, 325b shown in FIGS. 3A-3B.

Returning to FIG. 2, in some implementations of a security score engine 215 (or another system element), a risk resolution engine 252 can be provided that is configured to develop and maintain a listing of countermeasures available for one or more different host devices and related host device operating systems, networks, etc. Risk resolution engine 252 can further be used to map known countermeasures to particular vulnerabilities and other attributes, such as attributes described in neutral assessment guidelines utilized by neutral assessment engine 248. Further, in some implementations, a risk resolution engine can operate in cooperation with a device manager 254 cataloguing (e.g., through device data 262) a variety of different device types, as well as individual host devices for which security postures (and/or security scores) have been generated by security score engine 215. For instance, some countermeasures may be more compatible with or more effective on some devices or devices types than others. Further, risk posed by particular vulnerabilities can introduce more risk to some devices and device types than others. For instance, a device manager 254 can identify that a particular host device is a mobile device, such as a smart phone, and the countermeasures, threats, and vulnerabilities identified as relevant to the host device (and employed in the generation of use-based risk scores and use-based countermeasure recommendations) may depend at least in part on this information.

As noted above, users, in response to being presented with use-based risk scores, can utilize a security dashboard generated by a security dashboard engine 242, 244 to launch one or more remedies for sub-standard security scores for some uses of the host device. Host device attributes that are identified as negatively impacting a particular use's security score for a host device can be mapped to known countermeasures and other remedies identified and catalogued, for example, using a risk resolution engine 252. Such countermeasures can be further filtered based on the countermeasures' and remedies' compatibility with the host device in question. Such mappings and filters can be performed, in some implementations at security score engine 215. Remedy data 260 indicating the identified countermeasures and remedies can be communicated to the security dashboard engine, for instance, in response to a user selection of a security dashboard control, such as, for example, a FIX button (e.g., 315, 318). In some instances, available countermeasure data that could potentially apply to a particular host device can, instead, be communicated together with score data, security posture data, or other data used by the security dashboard engine (e.g., 242, 244) in the rendering of a security dashboard including use-based risk scores for a particular host device, among other techniques. Countermeasure and remedy information can also include information or instructions for use in developing automated requests to deploy the countermeasure on the host device (e.g., based on a selection of a corresponding FIX button by a user), or to provide instructions to a user for implementing the presented countermeasures. Indeed, in some instances, a single click of a FIX button (or other similar control) can prompt the automated selection of a particular remedy or countermeasure (such as a remedy identified as having the best reputation or highest effectiveness (e.g., from a neutral assessment of countermeasures) or even countermeasures of particular preferred or default vendors) in response to the selection of the button. In other instances, users can be presented with a menu of available countermeasures (e.g., generated from remedy data 260) that could be deployed to improve a host device's particular use-based risk score, and selection of a particular one of the countermeasures can cause the particular countermeasure to be deployed, among other examples.

In some instances, an attribute or vulnerability detected as present on a host device may not be able to be remedied completely by solutions offered for substantially immediate deployment through the security dashboard. For instance, user behavioral history may be considered among hardware and software attributes as attributes of a host device influencing the risk of using the host device in certain activities. Remedies, in such instances, may include, for instance, guidance or training modules offered to the relevant user so that user behavioral traits can be improved. Additionally, some hardware-based attributes may not be able to be remedied, upgraded, repaired, or otherwise remedied completely or launched from the security dashboard, although instructions, links to ecommerce pages offering recommended hardware components, and other information can be presented to the user to guide the user in the deployment of such remedies.

In some implementations of system 100, it may be desirable to provide for secure storage and communication of score data at the host device. For instance, it may be desirable to cause a master copy of score data (whether use-based scores, security posture data, or otherwise) to be isolated from the operating system of the host device thereby guarding against tampering with the score data. In some implementations, this can be accomplished through secured hardware components, such as chipset employing secured memory container (e.g., 265, 266) and secured network access outside of the operating system of the host device. For instance, a secure communication manager 255 (in connection with a device manager 254 managing authentication to the corresponding host device (e.g., 205, 210)) can communicate directly with hardware based secure communication components of the host device to communicate and send updates to score data (e.g., 268, 270) for the respective host device. In some implementations, a secure storage area can be provided that is only accessible to limited states including a remote access with a special key to permit content access. Such secure storage areas can also be secured with a dedicated processor (or other processor separate from the host device's CPU), encryption, network access restrictions, among other examples.

Score data (e.g., 268, 270) generated for a host device can be used in applications beyond informing the user(s) of the host device and assisting the user(s) in remedying certain vulnerabilities and system weaknesses affecting the user's preferred use(s) of the host device. For instance, in some implementations, security score data of a host device can be maintained securely on the host device and provided to other devices in transactions with the host device to assist the other devices in appreciating risks associated with the host device and transactions involving the host device. Such information can also be shared with the host device to assist the host device in assessing its transaction partners as well. For instance, a security broker can be utilized to assist in facilitating such transactions as described, for instance, in U.S. patent application Ser. No. 13/718,043, filed Dec. 18, 2012, entitled "Security Broker," which is hereby incorporated by reference in its entirety as if explicitly set forth herein.

Figure 4A:
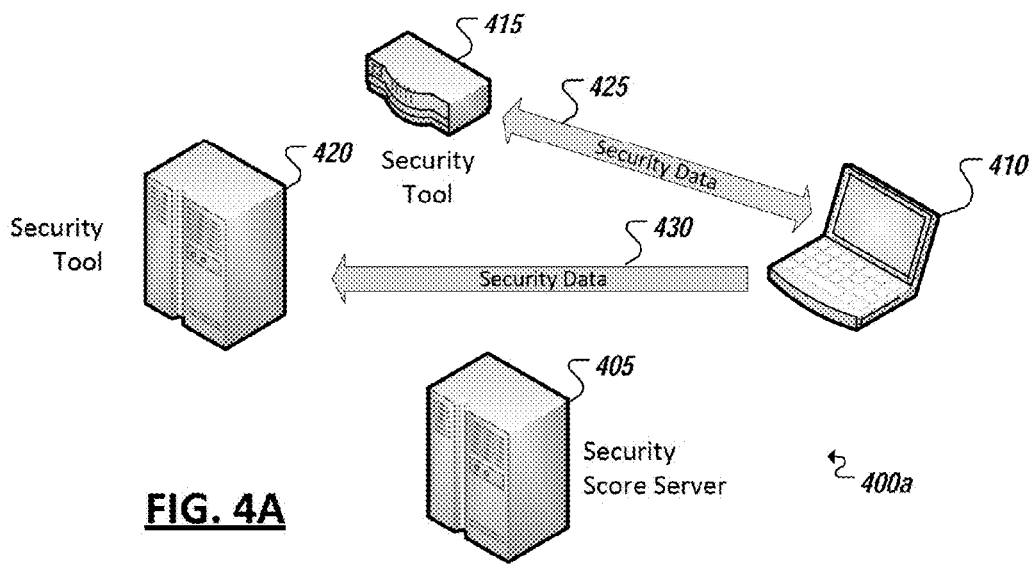
FIGS. 4A-4B are simplified block diagrams illustrating example operations of a security score system in accordance with at least one embodiment.
Figure 4B:
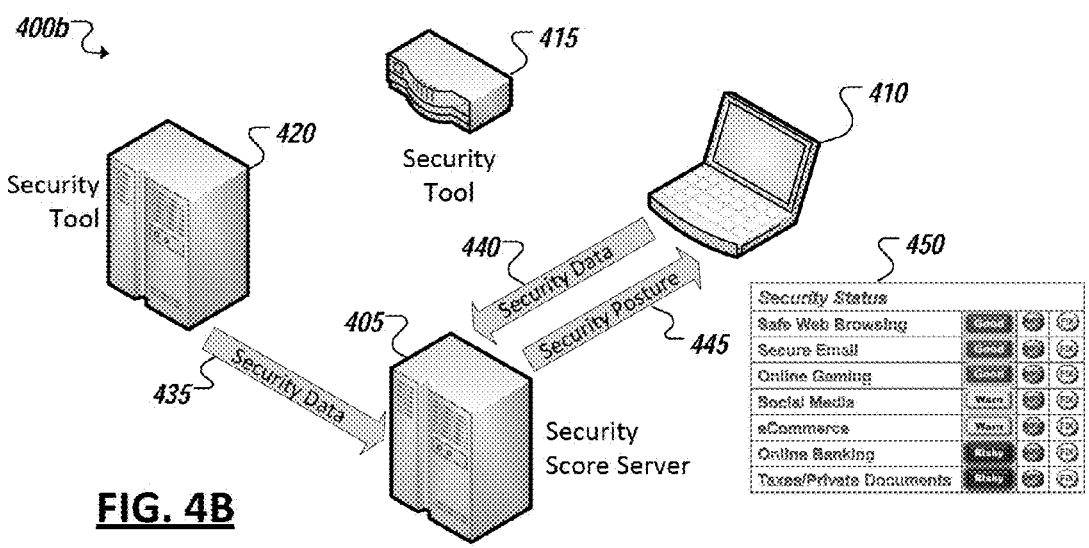

Turning now to the examples of FIGS. 4A and 4B, simplified block diagrams 400a-b are shown illustrating example operations including an example security score server 405 and host device 410 employing a security dashboard engine. In this particular example, security tools 415, 420 are employed either remote from or local to the host device 410 and provide security services for the host device 410. Additionally, security data 425, 430 is collected by security tools 415, 420 in connection with the services they provide. Such security data can include attribute information of the host device 410. Additionally, attribute information can be collected or be maintained internally at the host device 410. In some cases, security data (e.g., 425) identifying attributes of the host device 410 (such as detected vulnerabilities, user behavioral trends, network characteristics, and other system configurations) can also be returned to and shared with the host device 410. In either instance, security data (e.g., 435, 440) collected by local or remote security tools, returned by security tools to the host device 410, or collected or maintained by the host device 410 itself can be communicated to a security score server 405, as shown in FIG. 4B.

Security score server 405 can use received security data 435, 440 to generate security score data 445 that can be used in generation of a security dashboard 450 including a plurality of use-based risk scores for presentation at host device 410. Security score data 445 can include data embodying security scores generated for the host device 410, including the plurality of use-based risk scores, data embodying a security posture for the host device 410 that can be further processed at the host device 410 to generate use-based risk scores, as well as other security scores. A security dashboard engine or other tool, either installed at the host device 410 or served by a remote server can further process the security score data 445 to generate or identify use-based risk scores and render a representation of the use-based risk scores for presentation on the host device 410.

Turning to FIG. 5, a chart 500 is shown representing an example of security score data processed to generate a particular use-based risk score. Security score data (e.g., 445), such as security posture data describing identified attributes of the host device determined to affect its security, such as through a mapping of attributes to known vulnerabilities and countermeasures, as well as values indicating the seriousness, importance, effectiveness, and overall relevance of the mapped attributes to the security of the host device. Such information can be utilized to generate security scores. For instance, in the example of FIG. 5, security posture data has been identified listing host device attributes identified as potentially affecting or otherwise germane to the security of the host device. Further, a subset of these attributes can be identified as pertaining to security of or risk associated with a particular one of a set of potential uses of the host device.

Such identified attributes can include the presence of anti-malware software on the host device, encryption on the host device, patches installed on the host device, anti-theft, firewall applications, system recovery status, among other attributes and examples.

From security posture data for the host device, the current status of each host device attribute can be identified, such as an identification of version of a particular application, patch, or security tool, its availability, and whether the particular attribute, software, tool, etc. is active or not. From this information, the respective attributes can be scored relative to the particular host device use, for instance, based on each attribute's relative importance to the host device's security during the use (i.e., the degree to which the particular attribute can potentially positively or negatively influence the security of the host device during the use). The score components of the subset of identified host device attributes can then be compiled to generate a composite use-based risk score (e.g., 505) for the particular use of the host device (e.g., ecommerce, online banking, email, web browsing, etc.). Such attributes, as described in security posture data for instance, can be re-used in the generation of other use-based risk scores as well as aggregate security scores for the host device, among other examples.

As introduced above, in some implementations, an aggregate security score can be generated for a host device 410 based on security data collected at security tools (e.g., 415, 420) and the host device 410, including the same security data used to calculate use-based risk scores for the host device. Further, in other instances, security score data, such as a security posture for the host device, or even a plurality of use-based risk scores can be used to calculate an aggregate security score for the device. As shown in the example screenshot of FIG. 3D, a representation 350 of the overall health of the device can be presented in connection with a security dashboard also adapted to present representations of use-based risk scores for the host device. An aggregate security score (e.g., 355) for a host device can be represented so as to offer a user with a quick and easy-to-understand representation of the host device's overall security. In some implementations, the security score can be based on the host device's health relative to all other host devices monitored or scored using, for instance, a common security score server system or other system. For example, a mean or median security profile can be determined for a plurality of host devices and an aggregate security score generated from collected host device attributes can indicate the respective host device's security relative to the average host device monitored by the system (for which attributes are known), among other examples.

Figure 6A:
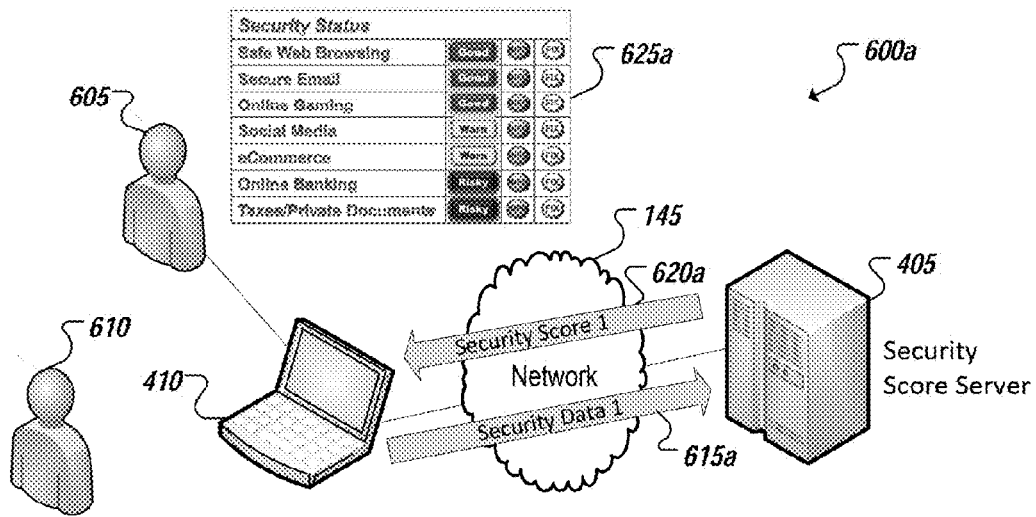
FIGS. 6A-6D are simplified block diagrams illustrating example operations of a security score system in accordance with at least one embodiment.
Figure 6B:
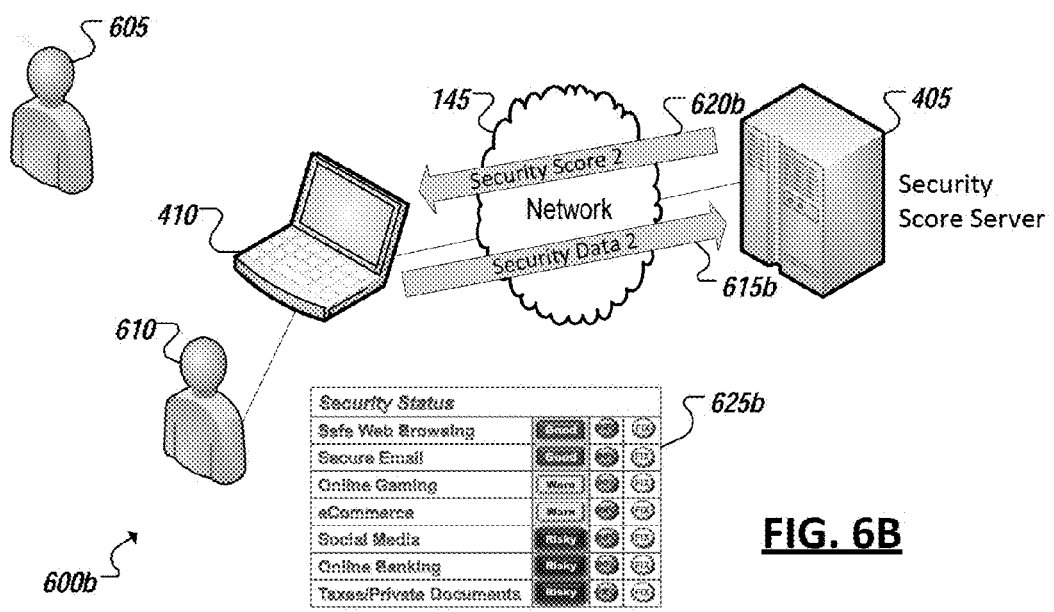

Turning to the examples of FIGS. 6A-6D, simplified block diagrams 600a-d are shown illustrating example operations including an example security score server 405 and a host device 410 for which security score data (e.g., 620a-d) is generated. As illustrated in the examples of FIGS. 6A-6B, in some implementations, security score data and use-based risk scores generated therefrom for a single host device (e.g., 405) can be based on the identity of the user of the host device. For instance, a single host device 410 may be shared by multiple users (e.g., 605, 610). The identity of the user at a given instance can be identified, for instance, by the host device 405 through a log-in, user authentication, or other technique, and the particular identity of the identified user can be included along with other reported host device attributes in security data (e.g., 615a-b) reported to a security score server 405.

As an example, as shown in FIG. 6A, a first user 605 can be identified as currently using a host device 410 and security data 615a can be sent to security score server 405 reporting that the first user 605 is currently using the host device 410 along with potentially other host device attributes. In some implementations, security data 615a can include a user profile determined for the first user 605, such as from behavioral data collected by the host device 405 and potentially other devices indicating historical trends in the user's use of the host device 405 as well as other devices known to be used by the user. Such data can include information describing trends in the user's web browsing habits, email habits, data and program access, storage habits, and other behaviors as well as, in some implementations, demographic information describing characteristics of the user that may suggest certain use risks, etc. In some implementations, user behavioral data can include principles and techniques described for example, in U.S. patent application Ser. No. 13/334,304, filed Dec. 22, 2011, entitled "User Behavioral Risk Assessment", and U.S. patent application Ser. No. 13/334,474, filed Dec. 22, 2011, entitled "User Behavioral Risk Assessment," both of which are hereby incorporated by reference in their entirety as if explicitly set forth herein. In some instances, personal information of the user can be omitted or abstracted from security data 615a collected and/or communicated to security score server 405.

As shown in FIG. 6A, security data 615a describing the identity and/or historical behavior of a first user 605 can result in the generation of corresponding security score data 620a, such as security scores or security postures for the host device 410 during the use by user 605. Accordingly, a first instance of a security dashboard 625a can be generated based on the security score data 620a, including presentations of a plurality of use-based risk scores, among other information. Turning to the example of FIG. 6B, a second user 610 can be identified as the current user of host device 410 at a second instance. Accordingly, security data 615b can be communicated to security score server 405 indicating the second user, as well as, in some instances, attributes and behavioral trends of the second user 610. Further, security score data 620b can be generated based on the second user's use of the host device and a corresponding security dashboard instance 625b presented. In some instances, the security scores and presented dashboard can have different values depending on which user 605, 610 is using the host device at a given moment, as shown in the examples of FIGS. 6A-6B. Further, in the case of use-based risk scores, the identity of the user of the host device can result in different use-based risk scores indicating that some uses are more risky when performed by the second user 610 using the host device 410 than the first user 605 using the same host device, as shown in the examples of FIGS. 6A-6B.

Figure 6C:
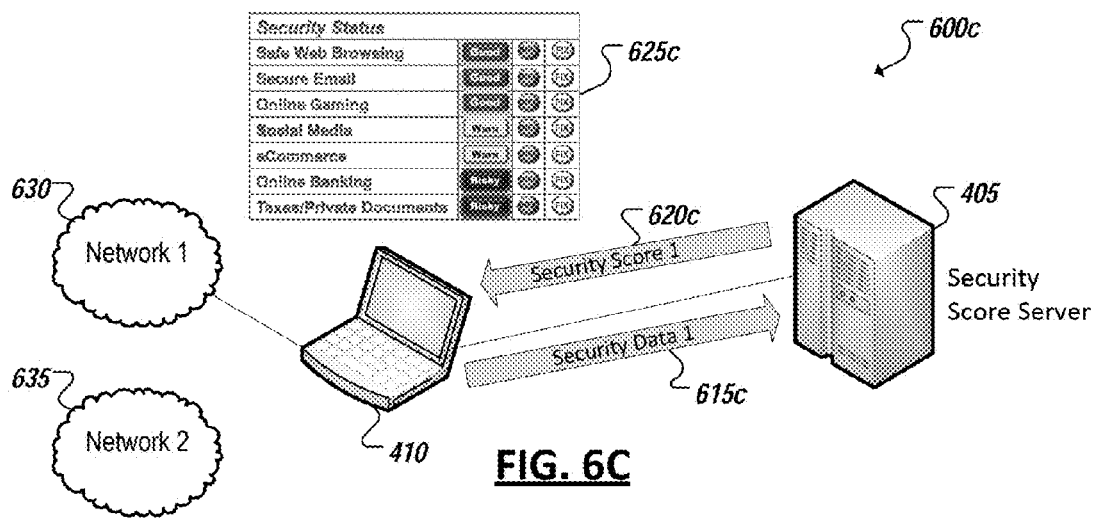
Figure 6D:
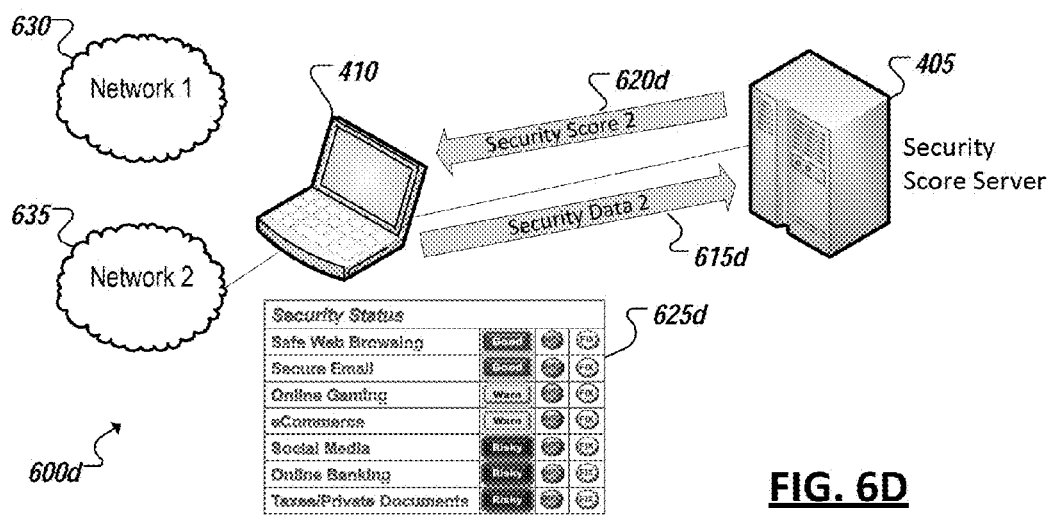

Turning to the examples of FIGS. 6C-6D, additional examples are shown illustrating how security scores for a particular host device can vary depending on detected circumstances and context of the host device's use. For instance, security data (e.g., 615c-d) collected and communicated to a security score server 405 can indicate the particular network or network gateway utilized by the host device 410 at a given instance, such as a network (e.g., 630, 635) used by the host device 410 to access the Internet and other digital resources. The host device 410 or security score server 405 can access attributes and security reports for various networks or network types and utilize this information in the generation of security data (e.g., 615c-d) and/or security score data (e.g., 620c-d). For example, at a first instance, it can be identified that the host device 410 is utilizing a first network 630 and security data can be sent that reports the identity of the first network 630 and/or attributes of the first network 630. The security score server 405 can consider this information and retrieve additional information relating to the network 630 in connection with the generation of security score data 620 sent to and used by the host device in connection with the rendering of a security dashboard reporting one or more use-based risk scores. Further, in FIG. 6B, connection of the host device to a second, different network 635 can result in different security data 615d being reported to the security score server 405 identifying the second network 635 that results in different security scores and security score presentations being generated for the host device 410. For instance, certain uses of the host device 410 can be determined to introduce more risk when the host device 410 utilizes a second network 635 than a first network 630, as represented in the examples of FIGS. 6C-6D. Security scores, including use-based risk scores, for a host device 405 can vary, in some cases, dynamically based on and responsive to changing identified characteristics of the host device's use 405, including changes to the attributes of the host device 405 itself (e.g., application downloads, patches or updates, connections to various peripheral devices, etc.) and changes to the host device's location (e.g., representing risk based on the host device's geographic location (e.g., as collected by a GPS, from an assigned IP address, or other geolocation information of the host device), among other examples.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. For instance, use-based risk score generation functionality can be provided fully or partially on the host device in some implementations, while score generation can be reserved to services hosted at remote devices in other implementations, with the host device rendering the scores as provided by the remote services. Additionally, while several potential use-based risk score categories and host device attributes used in the generation of host device security scores have been described and illustrated, it should be appreciated that the breadth and variety of different uses for which use-based risk scores can be generated and host device attributes that can be considered is potentially limitless. Other implementations, features, and details should be appreciated from the contents of this Specification.

Figures 7A, 7B:
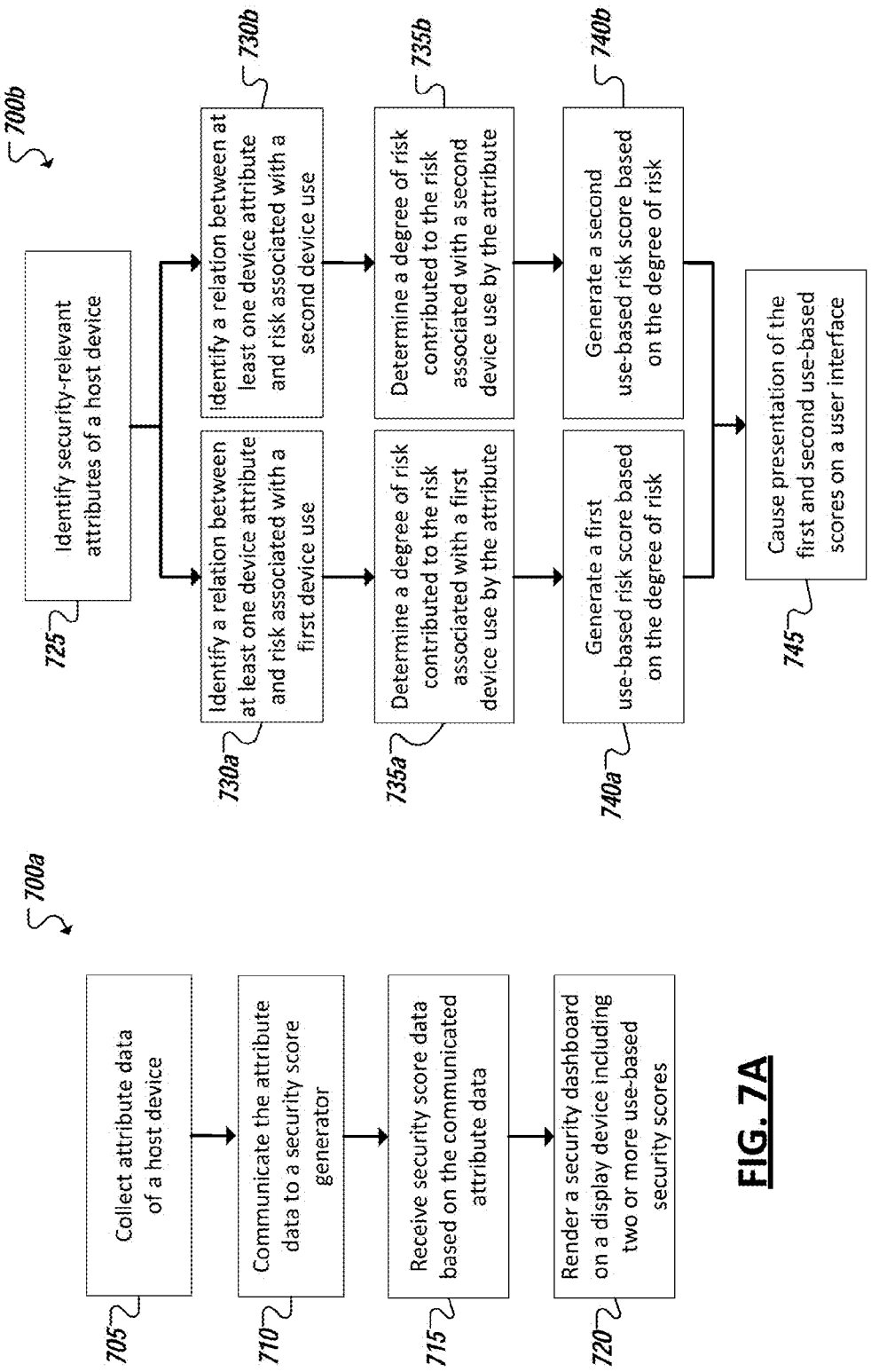
FIGS. 7A-7B are simplified flowcharts illustrating example techniques for providing use-based risk scores for a host device in accordance with at least some embodiments.

FIGS. 7A-7B are simplified flowcharts 700a-b illustrating example techniques involved in the generation of a set of use-based risk scores for a host device. In the example of FIG. 7A, attribute data (or security data describing security-relevant attributes) can be collected 705 from a host device as well as other devices having attribute data describing attributes of the host device. The collected attribute data can be communicated 710 to a security score generator. As alluded to above, attribute data can be collected from a plurality of sources and the sources can each communicate the attribute data to the security score generator. A security score generator can be embodied in server computing devices remote from the host device or at least partially as software components internal to the host device, among other examples. Security score data can be generated by and received from the security score generator based on the communicated attribute data. In some instances, security score data can be embodied as security posture data identifying host device attributes associated with particular vulnerabilities and/or computing risks, while in other instances received security score data can be include risk scores for the host device. A security dashboard can be rendered 720 based on the received security score data and include graphical representations of two or more use-based risk scores generated for the host device. In some instances, the use-based risk scores can be included in the received security score data while in other instances, security score data is processed (e.g., prior to rendering at 720) to generate the use-based risk scores.

Turning to FIG. 7B, an example technique is illustrated for generating use-based risk scores. For instance, security-relevant device attributes of the host device can be identified 725, for instance, in security posture data generated for the host device by an example security score generator. A plurality of potential uses of the host device can be identified and a relation can be identified 730a, 730b for two or more of the identified potential uses, between at least one of the identified device attributes and risk associated with the respective device use. In some instances, a plurality of attributes can be mapped to a potential device use. In some instances, a same device attribute can be mapped to two or more different device use risks, among other examples. A degree of risk associated with a respective device use can be determined 735a, 735b to be contributed by each respective device attribute relating to the risk and use-based risk scores can be generated 740a, 740b based on the determined degree of risk. In practice, a plurality of different attributes can be mapped to a certain potential device use and degrees of risk attributable to each of the related attributes in connection with the device use can be considered in the generation of a corresponding use-based risk score for the potential device use. Further, the generated use-base risk scores can be caused to be presented on a user interface utilizing, for example, a security dashboard engine deployed either local to or remote from the component(s) generating the use-based risk scores. Indeed, in some implementations, a security dashboard engine may be configured to both participate in the generation of use-based risk scores and the presentation of the use-based risk scores in one or more user interfaces on one or more host devices.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In general, subject matter of the present disclosure includes methods, software, computer executable instructions, and systems capable of performing such tasks as collecting attribute data of an endpoint computing device describing attributes of the endpoint computing device, communicating the attribute data to a security score generator, and receiving security score data for the endpoint computing device. A graphical dashboard interface can be caused to be presented on a display device, the dashboard interface presenting a plurality of security ratings based on the security score data, each security rating representing an amount of risk determined to be associated with a corresponding user activity on the endpoint device in a plurality of user activities.

In one example implementations, systems can be provided that include at least one processor device, at least one memory element, and a security dashboard generator. The security dashboard generator can collect the attribute data of the endpoint computing device, communicate the attribute data to a security score generator, receive security score data for the endpoint computing device (e.g., from the security score generator), and cause the presentation of the graphical dashboard interface presenting a plurality of security ratings each representing an amount of risk determined to be associated with a corresponding user activity on the endpoint device. Additionally, in some implementations, systems can further include the security score generator.

In some aspects, the plurality of security ratings can be generated from the received security score data. The security score generator can be local to the endpoint computing device. The security score generator can be remote from the endpoint computing device. At least one of the plurality of security ratings can indicate a measure of risk associated with a particular user activity on the endpoint device. The graphical dashboard interface can further include, for at least the security rating of the particular user activity, a corresponding repair button, wherein user selection of the repair button initiates a potential solution for reducing risk associated with a respective user activity. A particular vulnerability can be identified that corresponds to the indicated risk associated with the particular user activity, and a corresponding countermeasure can be identified that potentially remedies the particular vulnerability. User selection of the repair button corresponding to the particular vulnerability can initiate deployment of the countermeasure in some examples. Indeed, initiating a potential solution can include automatically deploying the countermeasure.

In some instances, the graphical dashboard interface can further include, for each of the security ratings, a corresponding information button, and user selection of an information buttons can cause information to be presented on the display device relating to a corresponding security rating. Such information can include a detailed view of endpoint computing device attributes contributing to the corresponding security rating, a description of security ratings for a corresponding user activity, among other details and examples. Each user activity can map to one or more known system vulnerabilities and presence of a particular one of the known system vulnerabilities on the endpoint computing device can increase risk represented in at least one of the security ratings. Indeed, any one of the known vulnerabilities may be associated with more than one user activity. Further, collected attribute data can describe a system configuration of the endpoint computing device, hardware of the endpoint computing device, attributes of a network connection of the endpoint computing device, as well as an identity of a user of the endpoint computing device, among other examples. A described identity of a user can further include historical behavioral attributes of system use of the user.

In some instances, a first security score data can be returned from the security score generator for the endpoint computing device at a first instance and second security score data can be returned from the security score generator for the same endpoint computing device at a second instance. For instance, a first user can be determined to be using the endpoint computing device at the first instance and a second user can be determined to be using the endpoint computing device at the second instance. In another example, a first network can be determined to be used by the endpoint computing device at the first instance and a second network can be determined to be used by the endpoint computing device at the second instance. In still another example, the endpoint computing device can be determined to be located in a first geographical location at the first instance and in a second geographical location at the second instance. The security score can further include an aggregate security score for the device identifying security of the endpoint computing device relative to other endpoint computing devices. A set of values for each of the plurality of security ratings can indicate safety of a corresponding one of the plurality of user activities, among other examples and combinations of the foregoing.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
collecting first attribute data at an endpoint computing device describing attributes of the endpoint computing device at a first instance, wherein the attributes at the first instance indicate that the endpoint computing device is located in a first geographical location at the first instance;
sending the first attribute data over a network to a remote security score generator;
receiving, at the endpoint computing device, first security score data for the endpoint computing device from the remote security score generator corresponding to the first attribute data; and
determining, from the first security score data, a first set of security ratings comprising a respective security rating for each of a plurality of different user activities capable of being performed by a user on the endpoint computing device, wherein each security rating indicates an amount of risk determined to be associated with the corresponding user activity when performed on the endpoint device based at least in part on the endpoint computing device being located in the first geographical location;
causing a graphical dashboard interface to be presented on a display device of the endpoint computing device, the dashboard interface presenting graphical representations of each of the first set of security ratings determined for the plurality of user activities, when the endpoint computing device is in the first geographical location;
collecting second attribute data at the endpoint computing device describing attributes of the endpoint computing device at a second instance, wherein the attributes at the second instance indicate that the endpoint computing device is located in a second geographical location at the second instance;
sending the second attribute data from the endpoint computing device to the remote security score generator;
receiving, at the endpoint computing device, second security score data for the endpoint computing device from the remote security score generator corresponding to the second attribute data;
determining, from the second security score data, a second set of security ratings comprising a respective security rating for each of the plurality of different user activities based at least in part on the endpoint computing device being located in the second geographical location; and
causing the dashboard interface to present graphical representations of each of the second set of security ratings determined for the plurality of user activities, when it is determined that the endpoint computing device is in the second geographical location.

2. The method of claim 1, wherein determining the security ratings for each of the plurality of different user activities comprises generating the security ratings from the received security score data.

3. The method of claim 1, wherein the security score generator is remote from the endpoint computing device.

4. The method of claim 1, wherein each user activity maps to one or more known system vulnerabilities and presence of a particular one of the known system vulnerabilities on the endpoint computing device increases risk represented in at least one of the security ratings.

5. The method of claim 4, wherein at least one of the known vulnerabilities is associated with two or more of the user activities.

6. The method of claim 1, wherein the collected attribute data describes a system configuration of the endpoint computing device.

7. The method of claim 1, wherein the collected attribute data describes attributes of a network connection of the endpoint computing device.

8. The method of claim 1, wherein the collected attribute data describes hardware of the endpoint computing device.

9. The method of claim 1, wherein a first user is determined to be using the endpoint computing device at the first instance and a second user is determined to be using the endpoint computing device at the second instance, wherein a first set of security ratings are to be determined for each of the plurality of different user activities as performed by the first user based on the first security score data, a second set of security ratings are to be determined for each of the plurality of different user activities as performed by the second user based on the second security score data, and the graphical representations presented on the graphical dashboard interface are to reflect the first set of security ratings when it is determined that the first user uses the endpoint computing device and reflect the second set of security ratings when it is determined that the second user uses the endpoint computing device.

10. The method of claim 1, wherein at least some of the values of the first set of security ratings are different from values of the second set of security ratings.

11. The method of claim 1, further comprising determining, from the security score data, an aggregate security score for the device, wherein the aggregate security score identifies security of the endpoint computing device relative to other endpoint computing devices and is viewable from the graphical dashboard interface.

12. The method of claim 1, wherein a set of values for each of the plurality of security ratings indicates safety of a corresponding one of the plurality of user activities.

13. At least one non-transitory machine accessible storage medium having instructions stored thereon, the instructions when executed on a machine, cause the machine to:
collect attribute data at an endpoint computing device describing attributes of the endpoint computing device including networks to which the endpoint computing device is connected;
communicate the attribute data to a remote security score generator, wherein first attribute data is communicated by the endpoint device when the endpoint computing device is connected to a first network and second attribute data is communicated by the endpoint device when the endpoint computing device is connected to a second network;
receive, at the endpoint computing device, first and second security score data for the endpoint computing device from the remote security score generator, wherein the first security score data is returned from the security score generator at a first instance and corresponds to the first attribute data, and the second security score data is returned from the security score generator at a second instance and corresponds to the second attribute data;
determine, from the first security score data, a first set of security ratings comprising a respective security rating for each of a plurality of different user activities capable of being performed by a user on the endpoint computing device, wherein each security rating indicates an amount of risk determined to be associated with the corresponding user activity when performed on the endpoint device based at least in part on the endpoint computing device being connected to the first network;
determine, from the second security score data, a second set of security ratings comprising a respective security rating for each of the plurality of different user activities based at least in part on the endpoint computing device being connected to the second network; and
cause a graphical dashboard interface to be presented on a display device of the endpoint computing device, the dashboard interface presenting graphical representations of the sets of security ratings determined for the plurality of user activities, when the endpoint computing device is connected to the first and second networks, respectively.

14. The storage medium of claim 13, wherein the graphical dashboard interface further includes, for at least the graphical representations of a particular one of the security ratings corresponding to a particular one of the user activities, a corresponding repair button, wherein user selection of the repair button initiates a potential solution for reducing risk associated with the particular user activity.

15. The storage medium of claim 14, wherein the instructions when executed further cause the machine to:
identify a particular vulnerability corresponding to the indicated risk associated with the particular user activity; and
identify a countermeasure potentially remedying the particular vulnerability, wherein user selection of the repair button corresponding to the particular vulnerability initiates deployment of the countermeasure.

16. The storage medium of claim 15, wherein initiating a potential solution includes automatically deploying a countermeasure.

17. The storage medium of claim 13, wherein the graphical dashboard interface further includes, for each of the security ratings, a corresponding information button, wherein user selection of one of the information buttons causes information to be presented on the display device relating to a corresponding security rating.

18. The storage medium of claim 17, wherein the information includes a detailed view of endpoint computing device attributes contributing to the corresponding security rating.

19. The storage medium of claim 17, wherein the information includes a description of security ratings for a corresponding user activity.

20. The storage medium of claim 13, wherein the collected attribute data describes an identity of a user of the endpoint computing device.

21. The storage medium of claim 20, wherein the described identity includes historical behavioral attributes of system use of the user, and at least one of the security ratings is based on the historical behavioral attributes of system use of the user.

22. A system comprising:
at least one processor device;
at least one memory element; and
a security dashboard generator, adapted when executed by the at least one processor device to:
collect attribute data at an endpoint computing device describing attributes of the endpoint computing device including networks to which the endpoint computing device is connected;

communicate the attribute data to a remote security score generator, wherein first attribute data is communicated by the endpoint device when the endpoint computing device is connected to a first network and second attribute data is communicated by the endpoint device when the endpoint computing device is connected to a second network;

receive, at the endpoint computing device, first and second security score data for the endpoint computing device from the remote security score generator, wherein the first security score data is returned from the security score generator at a first instance and corresponds to the first attribute data, and the second security score data is returned from the security score generator at a second instance and corresponds to the second attribute data;

determine, from the first security score data, a first set of security ratings comprising a respective security rating for each of a plurality of different user activities capable of being performed by a user on the endpoint computing device, wherein each security rating indicates an amount of risk determined to be associated with the corresponding user activity when performed on the endpoint device based at least in part on the endpoint computing device being connected to the first network;

determine, from the second security score data, a second set of security ratings comprising a respective security rating for each of the plurality of different user activities based at least in part on the endpoint computing device being connected to the second network; and cause a graphical dashboard interface to be presented on a display device of the endpoint computing device based on the received security score data, the dashboard interface presenting graphical representations of the sets of security ratings determined for the plurality of user activities, when the endpoint computing device is connected to the first and second networks, respectively.

23. The system of claim 22, further comprising the security score generator.

* * * * *